(12) United States Patent
Aho

(10) Patent No.: US 8,257,461 B2
(45) Date of Patent: Sep. 4, 2012

(54) METHOD OF PRODUCING FERTILIZER OUT OF SLUDGE

(75) Inventor: Olli Aho, Rovaniemi (FI)

(73) Assignee: Savaterra Oy, Rovaniemi (FI)

( * ) Notice: Subject to any disclaimer, the term of this patent is extended or adjusted under 35 U.S.C. 154(b) by 518 days.

(21) Appl. No.: 12/596,022

(22) PCT Filed: Apr. 18, 2008

(86) PCT No.: PCT/FI2008/050203
§ 371 (c)(1),
(2), (4) Date: Oct. 15, 2009

(87) PCT Pub. No.: WO2008/129127
PCT Pub. Date: Oct. 30, 2008

(65) Prior Publication Data
US 2010/0132421 A1 Jun. 3, 2010

(30) Foreign Application Priority Data

Apr. 19, 2007 (FI) ................................ 20075274

(51) Int. Cl.
C05F 11/08 (2006.01)
C05F 17/00 (2006.01)
C05F 11/00 (2006.01)
C02F 3/00 (2006.01)
C02F 1/02 (2006.01)
C05F 15/00 (2006.01)

(52) U.S. Cl. ...... 71/6; 71/11; 71/12; 210/96.1; 210/601; 210/742

(58) Field of Classification Search .................. 71/6, 11, 71/12, 15, 21; 210/96.1, 601, 742
See application file for complete search history.

(56) References Cited

U.S. PATENT DOCUMENTS

| | | | |
|---|---|---|---|
| 2,029,648 A * | 2/1936 | Austin | ............................... 71/12 |
| 4,230,676 A | 10/1980 | Taylor et al. | |
| 4,336,329 A | 6/1982 | Hesse et al. | |
| 5,413,129 A | 5/1995 | Shenoi | |
| 5,613,452 A | 3/1997 | Marchesi et al. | |
| 5,656,178 A * | 8/1997 | Marchesi et al. | ............. 210/770 |

(Continued)

FOREIGN PATENT DOCUMENTS

DE 42 26 584 2/1994

(Continued)

OTHER PUBLICATIONS

Uudenmaan ymparistokeskus (Uusimaa Regional Environment Centre, Finland) Decision No. YS 1384 (2006) pp. 1-11 with English translation.

(Continued)

*Primary Examiner* — Stanley Silverman
*Assistant Examiner* — Syed Iqbal
(74) *Attorney, Agent, or Firm* — Ladas & Parry LLP

(57) ABSTRACT

A method of producing fertilizer out of sludge, in which method sludge is heated with superheated steam for achieving hygienization to destroy pathogenic microorganisms. In the method, the sludge is heated to a temperature of 60 to 100° C. with superheated steam having a temperature of 200 to 600° C. to activate increasing of the amount of soluble carbon in the sludge and to restart biodegradation of the sludge by using non-pathogenic microorganisms still remaining in the sludge after the heating.

22 Claims, 4 Drawing Sheets

U.S. PATENT DOCUMENTS

2007/0272626 A1* 11/2007 Hirayama et al. ............ 210/770

FOREIGN PATENT DOCUMENTS

| | | |
|---|---|---|
| EP | 0 101 784 | 3/1984 |
| EP | 0 715 902 | 6/1996 |
| FR | 2 519 965 | 7/1983 |
| GB | 1 005 078 | 9/1965 |
| WO | 01/02027 | 1/2001 |
| WO | 02/28556 | 4/2002 |
| WO | 2005/085156 | 9/2005 |

OTHER PUBLICATIONS

English abstract and English translation of p. 5, lines 12-30; p. 6, lines 13-29 and p. 10, lines 10-34 as indicated in the International Search Report for FR 2519965 dated Jul. 22, 1983.

English claims, abstract and English translation of p. 3, lines 1-7; p. 4, line 5 and p. 5, line 2as indicated in the International Search Report for EP0101784 dated Mar. 7, 1984.

English abstract of DE 4226584 dated Feb. 17, 1994.

English abstract of EP 0715902 dated Jun. 12, 1996.

* cited by examiner

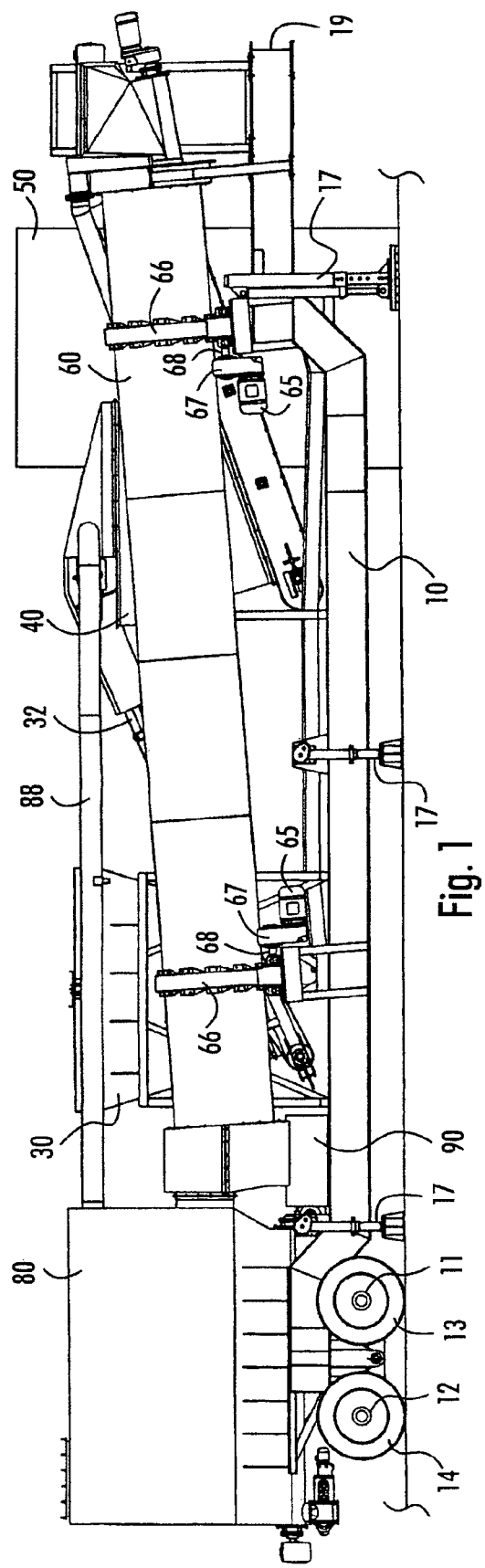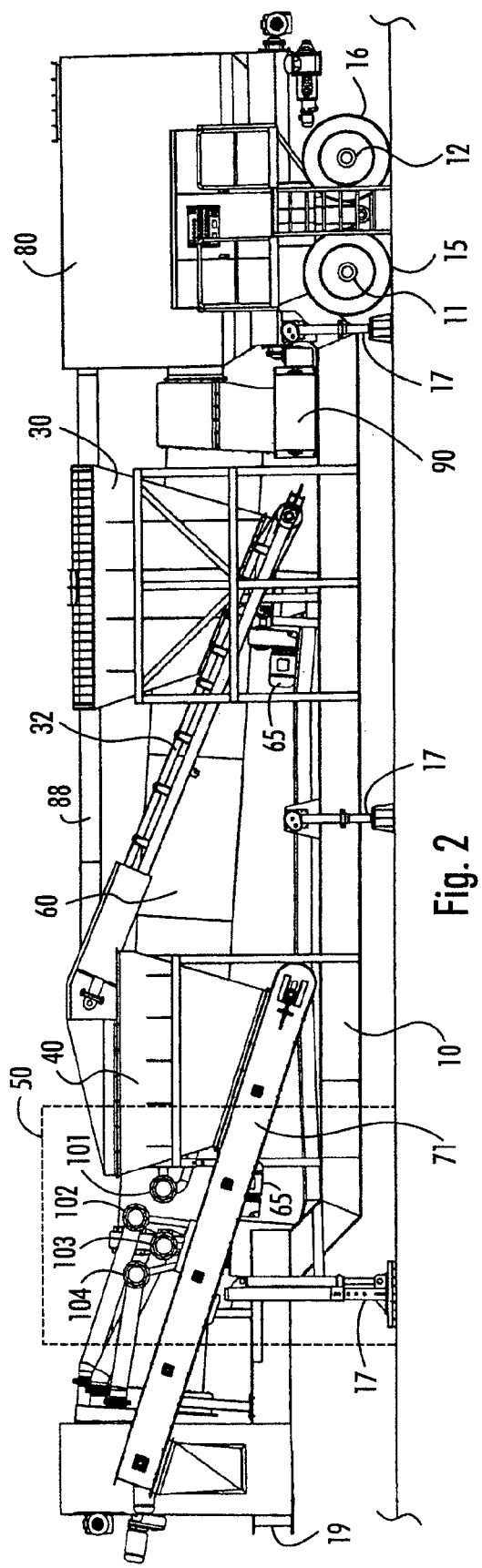

METHOD OF PRODUCING FERTILIZER OUT OF SLUDGE

FIELD

The invention relates to a method of producing fertilizer out of sludge, in which method sludge is heated with superheated steam for achieving hygienization to destroy pathogenic organisms.

BACKGROUND

There are different alternatives for treating sludge. For example, there is known digestion that is anaerobic treatment, as well as composting that is aerobic treatment, i.e. treatment utilizing oxygen. Further, thermal treatment is known, in other words treatment taking place by heating.

Of treatments taking place by heating, for instance drying of sludge with direct hot air is known, but a disadvantage of this technique is the large amount of energy required and dust formation in the material, resulting from the drying. Of methods utilizing heating, also sludge treatment with hot water is known, but a problem with this method is that the water used in the method must be purified, which causes costs. Further, of treatments taking place by heating, methods using ordinary water vapour are known but according to the applicant's observations, they are not completely satisfactory as regards the efficiency of purification and thermal economy.

In purifying waste or other material, the use of superheated steam is also known. Superheated steam is a gas mixture formed of water vapour and combustion gas. Some known solutions are presented in publications U.S. Pat. No. 5,656,178, U.S. Pat. No. 5,613,452, U.S. Pat. No. 5,413,129, DE 4226584, EP 0715902, U.S. Pat. No. 4,336,329, WO 01/02027 and WO 02/28556, but the publications relate to sterilization of material, which also excessively eliminates the useful microorganisms, preventing thus utilization of the material as fertilizer.

Relating to the field of the present invention, a method using superheated steam is known from publication EP 101784 for manufacturing fertilizer out of bark and sludge. In the method disclosed in this publication, sludge is heated to a temperature of 120 to 140° C. by using superheated steam having a temperature of 140 to 600° C. However, the method does not give optimal results with regard to the fertilizer properties of the final product and the thermal economy of the method because of, in particular, the high temperature to which the material to be treated is heated.

BRIEF DESCRIPTION

An object of the invention is to implement the method in a way that allows problems related to the prior art to be reduced. This is achieved with a method according to the invention, characterized by the sludge being heated to a temperature of 60 to 100° C. with superheated steam having a temperature of 200 to 600° C. to activate increasing of the amount of soluble carbon in the sludge and to restart biodegradation of the sludge by using non-pathogenic microorganisms still remaining in the sludge after the heating.

Preferred embodiments of the invention are described in the dependent claims.

The invention is based on the idea of not heating the sludge to be treated to too high a temperature while still using superheated steam having a sufficiently high temperature.

The method according to the invention provides several advantages. The invention allows fertilizer of high quality to be achieved with regard to thermal economy in a manner that is still sufficiently cost-effective. The preferred embodiments of the invention and other, more detailed embodiments intensify the advantages of the invention. Controlling the moisture conditions, in particular, intensifies the advantages of the invention.

LIST OF FIGURES

The invention will now be described in more detail in connection with preferred embodiments, referring to the attached drawings, in which FIG. 1 shows an embodiment of an apparatus for treatment with superheated steam, used in the method;

FIG. 2 shows the apparatus illustrated in FIG. 1, seen from the opposite direction;

DESCRIPTION OF THE EMBODIMENTS

Figure 3:
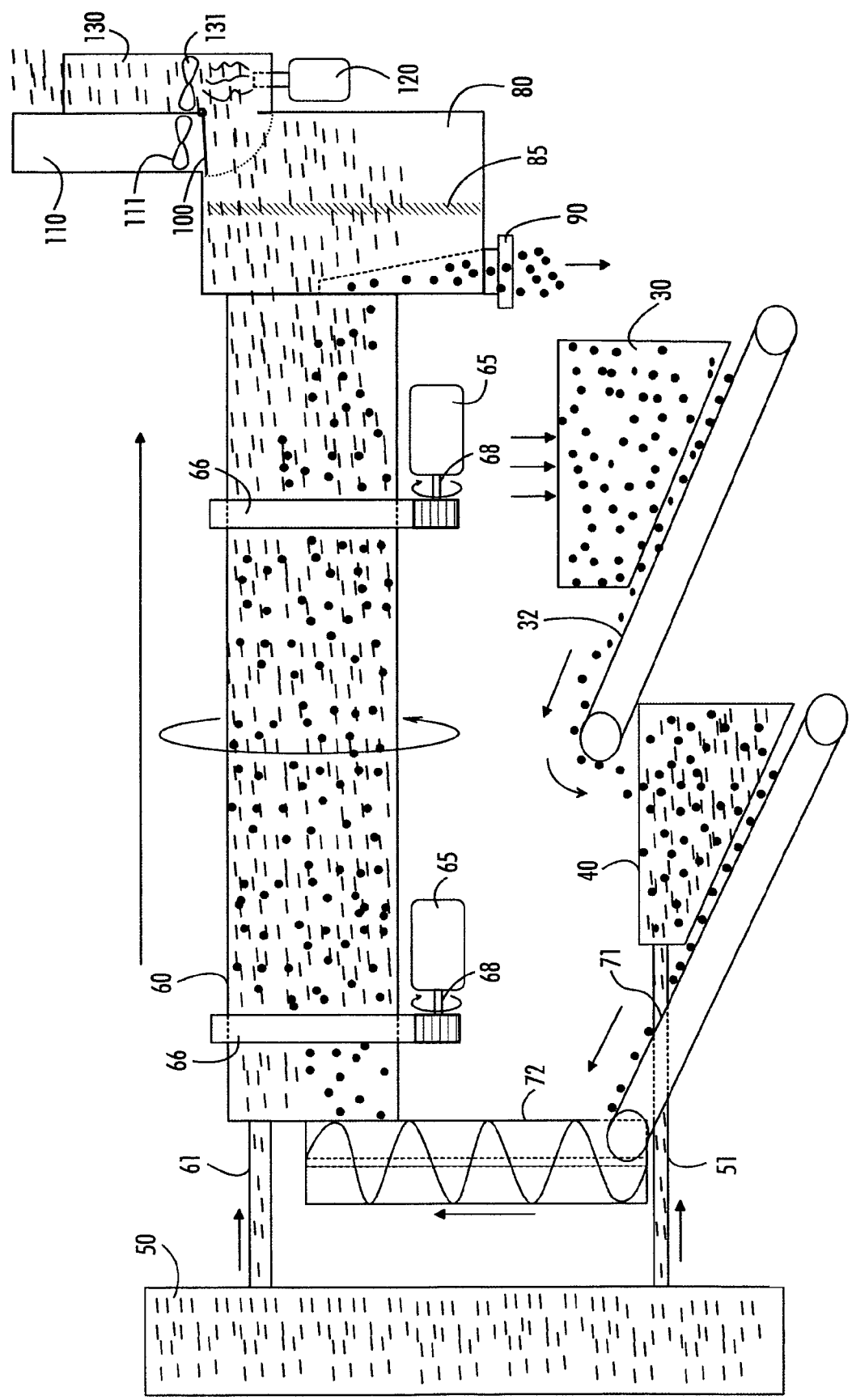
FIG. 3 shows a principled view of an embodiment of the apparatus for treatment with superheated steam, used in the method.

Referring to the figures, the method may use an apparatus of the type shown in FIGS. 1 to 3, for example. The apparatus according to FIGS. 1 to 2 in a preferred embodiment is a movable unit supported by a frame 10 and comprising axles 11 and 12 with tyres 13 to 16 as well as bearer feet 17 and an attachment point 19 for a tractor vehicle.

As regards FIG. 3, it is to be noted that the short lines intend to illustrate superheated steam by way of principle only, and the round circles intend to illustrate the material to be treated by way of principle only, this material being, as mentioned, sludge, particularly one or more of the following: municipal sludge, agricultural sludge, sewage sludge, i.e. purification plant sludge. The sludge, for instance sludge received from a municipal or another regional waste-water purification plant, is sludge that has already biodegraded, i.e. been composted, once, and is used as a starting point in the present method of producing fertilizer.

To receive the material to be treated, i.e. sludge, the apparatus comprises a receiving hopper 30, into which the sludge may be brought for instance with a bucket loader or another transfer means, such as a conveyor or a transfer channel. After the sludge-receiving means 30, such as a receiving hopper 30, in other words below the hopper 30, for example, the apparatus comprises a transfer conveyor 32 arranged to transport the material into a first steam-treatment unit 40.

To generate superheated steam, the apparatus comprises a superheated steam generation unit 50, which by means of a distribution line 51, for example, generates superheated steam for the first steam-treatment unit 40. Correspondingly, the apparatus may comprise a second steam-treatment unit 60, for which the superheated steam generation unit 50 is arranged to provide superheated steam via the a distribution line 61, for example. The sludge treated in the first steam-treatment unit 40 is transferred to the second steam-treatment unit 60 by means of one or more transfer means 71, 72 or the like transfer means. In the example of the figures, the transfer means 71 is, for example, a scoop-type belt conveyor, and the transfer means 72 is a screw-type transfer means.

It is to be noted that neither a separate receiving hopper 30 nor another separate receiving means 30 is necessary but the material could be brought directly or through a conveyor, for example, to the steam-treatment unit 40 or a drum-like rotatable steam-treatment unit 60.

In FIG. 2, the superheated steam generation unit 50 is shown only with broken lines in order not to cover the attachment points for the attachment of the steam generation unit 50, such as attachment flanges 101 and attachment flanges 102 to 104. In FIG. 2, the attachment flange or the like attachment point 101 indicates the attachment point of the steam distribution line 51, which is most clearly shown in FIG. 3, for bringing superheated steam to the first steam-treatment unit 40. Correspondingly, reference numbers 102 to 104 in FIG. 2 show the attachment flanges or other corresponding attachment points to which the distribution line 61 most clearly seen from FIG. 3 is attached to bring superheated steam to the second steam-treatment unit 60.

In regard of the superheated steam generation unit 50, it is to be noted that it is an apparatus that generates a gas mixture out of water vapour and combustion gas of a fuel. The fuel the combustion of which generates the required combustion gas may be light fuel oil, for instance.

As regards dimensions, it is to be noted that the length of the apparatus shown in FIGS. 1 to 2 is, for example, about 20 meters, while the diameter of the second steam-treatment unit 60, such as drum 60, is about 1 meter, for example. The capacity of the apparatus for treatment with superheated steam is several thousands of kilograms per hour.

The invention involves a method for producing fertilizer out of sludge, in which method sludge is heated with superheated steam to achieve hygienization to destroy pathogenic organisms. In the method, the sludge is heated to a temperature of 60 to 100° C. with superheated steam having a temperature of 200 to 600° C. to activate increasing of the amount of soluble carbon in the sludge and to restart biodegradation of the sludge by using non-pathogenic microorganisms still remaining in the sludge after the heating.

In the sludge treatment, the temperature of the superheated steam used in the heating is between 200 and 600° C. According to the applicant's observations, the temperature range of 300 to 600° C. and particularly 300 to 400° C. is especially suitable in view of the ensemble formed by the feasibility of the method, the properties of the final product (fertilizer) and the thermal economy of the method.

In the example of the figures, superheated steam is used in both the first steam-treatment unit 40 and the second steam-treatment unit 60.

In the example of the figures, there are two steam-treatment units using superheated steam, i.e. units 40 and 60, but the invention is not restricted to a given number of steam-treatment units. If two steam-treatment units are used in accordance with an embodiment shown by the figures, the units are preferably of different types, for instance in such a way that one of them is a rotatable drum. In the examples of the figures, the latter, i.e. the second steam-treatment unit 60 is a rotatable drum like this, rotated by means of motors 65, for example, from the contact surface 66 of the outer periphery of the drum. The force of the rotating motor 65 of the drum 60, i.e. the second steam-treatment unit 60, is transmitted to the drum through a gear system 67 and a shaft 68, for example.

A hopper-type or the like steam-treatment unit indicated by reference numeral 40, where gravity or an apparatus part condenses the material so that it becomes denser, is good in the sense that the steam cannot, due to the density of the sludge material to be purified, i.e. hygienized, proceed through the material too easily, i.e. too rapidly, i.e. without heat emission.

A steam-treatment unit 60 implemented by means of a rotatable drum 60 is good in the sense that it allows the sludge material to be purified, i.e. hygienized, to get into efficient interaction with the superheated steam. In other words, the material encounters in the drum what could be called a steam curtain or steam tunnel.

If the apparatus has only one steam-treatment unit, in other words if the sludge travels through only one steam-treatment unit, the preferred embodiment involves specifically a drum 60, which is rotated, as mentioned.

In a preferred embodiment, the sludge is heated to a temperature of 60 to 90° C. Preferably, the method is such that the sludge is treated with superheated steam for 20 to 60 minutes, most preferably for 20 to 30 minutes.

During the treatment with superheated steam, the moisture of the sludge is monitored and controlled to prevent substantial drying of the sludge. The method is preferably such that during the treatment with superheated steam, the moisture of the sludge is monitored and controlled in such a way that the moisture changes in the treatment by +/−2% at the most to prevent substantial drying of the sludge.

One purpose of the control of the sludge moisture in the steam treatment with superheated steam is the desire to prevent the sludge from drying to such an extent that it would dust at later stages after the steam treatment, for example outdoors in a clamp while at the biodegradation stage, or later still, for example when the fertilizer, i.e. the final product of the method, is transported or packed.

Another reason for controlling the conditions in the steam treatment with superheated steam is the desire to improve the nutrient properties of the final product, i.e. the fertilizer. Thus, the method is, in a preferred embodiment, such that the evaporation of nitrogen-containing ammonia or another nitrogen compound generated by the sludge is minimized by maintaining a moisture level and/or a temperature during the treatment with superheated steam. The moisture is adjusted to a sufficiently high level, and the temperature is adjusted to a sufficiently low level. This feature improves the nutrient content of the final product, i.e. the fertilizer, because nitrogen is an important nutrient which fertilized soil is capable of exploiting.

In a preferred embodiment, the method is such that during the treatment with superheated steam the moisture of the sludge is controlled in such a way that the amount of water to be mixed into the combustion gas is changed in generating superheated steam.

As regards the drum-like steam-treatment unit 60, it is to be noted that the steam flow is arranged in the longitudinal direction of the drum substantially through the whole drum in such a way that on the steam inlet side, the steam is brought through the distribution line 61 or the like structure into the drum 60, and the steam is discharged from the drum into a settling chamber 80, for example, or the like suitable structure.

The sludge treated in the drum 60 is removed from the drum 60, and the treated material may be positioned on the ground, for example as a clamp in the vicinity of the drum. Alternatively, the treated sludge may be taken elsewhere, in which case the treated material obtained from the outlet side of the drum 60 is taken to a conveyor 90 and further for example to be transported by a lorry or another transport means even a long way from the steam-treatment apparatus.

Thus, in a preferred embodiment the method is such that the re-bio-degradation takes place at least mainly elsewhere than in the steam-treatment apparatus having performed the sludge heating with superheated steam. In a preferred embodiment, the biodegradation of the sludge takes place, i.e. is performed, in a clamp or another heap of formation to which the sludge has been transported from the steam-treatment unit having performed the treatment with superheated steam.

In order to know when the fertilizer is ready for direct use or for packing, for instance, the method is preferably such that the maturity degree of the biodegradation of the sludge is monitored by measuring gas emissions of the sludge. In a preferred embodiment, carbon dioxide emissions are measured, and most preferably, the maximum rate of carbon dioxide generation in the carbon dioxide emission is less than 2 mg/g/day. In one experiment, a carbon dioxide generation rate of 1.3 mg/g/day was measured in the final state after the steam treatment and biodegradation.

In a preferred embodiment, the duration of biodegradation is 1 to 3 months. According to the applicant's observations, this results in good balance in view of the maturity and efficiency of the fertilizer.

Returning to the final end of the steam-treatment drum 60, i.e. the structures of the outlet, it is to be noted that for example in the settling chamber 80 the apparatus comprises a filter 85, such as a grate-type screen, for preventing particles in the air current from going through. Depending on the position of the controller 100, the exiting steam flow having lost heat can be either removed from the apparatus as such through a discharge channel 110 or it can be removed through a discharge channel 130 in such a way that it is burnt by an afterburner 120 that burns gases having harmful smells. Removal of the steam flow can be contributed to by means of fans 111 and 131.

In a preferred embodiment, the heating hygienization is carried out at a normal atmospheric pressure in an unpressurized steam-treatment unit. Usability is also improved by the hygienization being performed as an open, i.e. continuous-type, process instead of a closed batch-type process. Thus, the method is such that in a continuous-type process sludge is brought to the hygienization during the process, and purified hygienized material is removed from the hygienization during the process.

From the second steam-treatment unit 60, i.e. the drum 60, the steam is thus removed into the settling chamber 80. Correspondingly, also from the first steam-treatment unit 40 the steam is removed into the settling chamber 80 through a transfer channel 88, for example, which is seen from FIGS. 1 to 2.

It is to be noted that it is not even the intention to heat sludge, particularly municipal sludge, agricultural sludge or sewage sludge, i.e. purification plant sludge, to as high a temperature as the superheated steam has, because the primary aim is to kill the pathogenic organisms from the material while intentionally preserving the organisms that are advantageous to biodegradation and the fertilizer. In the hygienization treatment carried out with superheated steam, the material to be purified is heated to a temperature of 60 to 100° C., which is sufficiently high to kill pathogenic organisms but sufficiently low to prevent sterilization of the material to be purified. At too high a temperature, treatment taking too long would cause the material to be sterilized, even if a temperature that is too high only momentarily or for a somewhat short time does not necessarily cause sterilization.

The organisms intended to be killed in the hygienization include enterobacteria, salmonella bacteria, coliform bacteria, plant disease pathogens, weeds etc. The organisms to remain in the material treated, i.e. hygienized, in the method are the material's natural, harmless, i.e. non-pathogenic microorganisms.

The method is, by nature, a microbiological method utilizing superheated steam for producing fertilizer out of sludge, which has already undergone biodegradation once, by using hygienization heating generated by superheated steam to activate biodegradation taking place somewhat later.

Experiments of the method according to the invention have resulted in the following observations, for example.

In experimental arrangement 1, the capacity of the heat treatment with superheated steam was detected, depending on the conditions (temperature, rotating rate, tilt of the drum in the longitudinal direction), to be 50 to 180 tn/h (tons, i.e. 1 000 kg, per hour), the energy consumption being 193 MJ/tn (megajoules per ton, i.e. 1 000 kg). By comparison, an old method, i.e. drying sludge with hot air, resulted in a capacity of 50 to 100 tn/h with an energy consumption nearly ten times higher, although the upper value of the capacity (100 tn/h) was only just over half of the upper value obtained with the method of the invention (180 tn/h), and further, a significant difference was that in conventional dry-air drying the loss of nutrients useful for the fertilizer was considerably great.

In the experimental arrangement 2, the object of the treatment with super-heated steam was sludge that had been composted for a year. Before the treatment the number of enterobacteria (part of which were pathogens) was 120 000 cfu/g (colony-forming unit/g), but after the treatment the number was below 10 cfu/g, in other words below the measuring accuracy, i.e. below the detection limit, the legislative maximum value allowed being 1 000 cfu/g. Also the number of clostridial bacteria could be reduced to a value that was less than half of the previous one, in other words the number before the treatment was 5 600 cfu/g and the number after treatment 2 700 cfu/g. Letting the sludge settle after the treatment with superheated steam, for example for 24 hours, reduced the number of clostridia to the proportion of 10% of the original. Clostridium is a sporulating bacterium, so it endures more heating treatment.

Thus, the treatment in question is not sterilization of sludge but its hygienization. A particular object is to destroy possible pathogens of intestinal origin, i.e. salmonella and *E. Coli*, which belong to the group of enterobacteria.

In the experimental arrangement 3, the object of the treatment with super-heated steam was untreated, i.e. raw, anaerobic sludge obtained from a wastewater purification plant. Before the treatment, the number of enterobacteria (part of which were pathogens) was 12 000 cfu/g (colony-forming unit/g), whereas after the treatment with superheated steam the number was below 10 cfu/g, in other words below the measuring accuracy, i.e. below the detection limit, the legislative maximum value allowed being 1 000 cfu/g.

In experimental arrangement 3, also the *E. Coli* content was significantly decreased. Before the treatment the *E. Coli* content was 17 000 cfu/g (colony-forming unit/g), whereas after the treatment the number was below 10 cfu/g, in other words below the measuring accuracy, i.e. below the detection limit, the legislative maximum value allowed being 1 000 cfu/g.

As in experimental arrangement 2, also in experimental arrangement 3 the clostridium content was reduced less than the enterobacterium content. Before the treatment, the number of clostridia was 7 100 cfu/g and after the treatment 1 500 cfu/g, in other words the number was reduced to a proportion of 20%, i.e. about the fifth, of the original. However, letting the sludge settle for even as short a time as 24 hours after the treatment with superheated steam reduced the clostridium content to the proportion of 10%, i.e. the tenth, of the original.

Relating to the experimental arrangement 2 (with sludge already composted), the following was measured with regard to the physical and chemical properties of the sludge.

TABLE 1

| Variable | Before treatment | After treatment |
| --- | --- | --- |
| Dry matter content % (TS) | 57 | 62 |
| Conductivity (ms/m) | 31 | 25 |
| PH | 7.1 | 74 |
| Amount of soluble $NH_4$—N, i.e. ammonium nitrogen | 493 | 417 |

Relating to the experimental arrangement 3 (untreated raw aerobic sludge), the following was measured with regard to the physical and chemical properties of the sludge.

TABLE 2

| Variable | Before treatment | After treatment |
| --- | --- | --- |
| Dry matter content % (TS) | 26 | 28 |
| Conductivity (ms/m) | 220 | 240 |
| PH | 8.3 | 8.3 |
| Amount of soluble $NH_4$—N, i.e. ammonium nitrogen | 3816 | 3990 |

Figure 4:
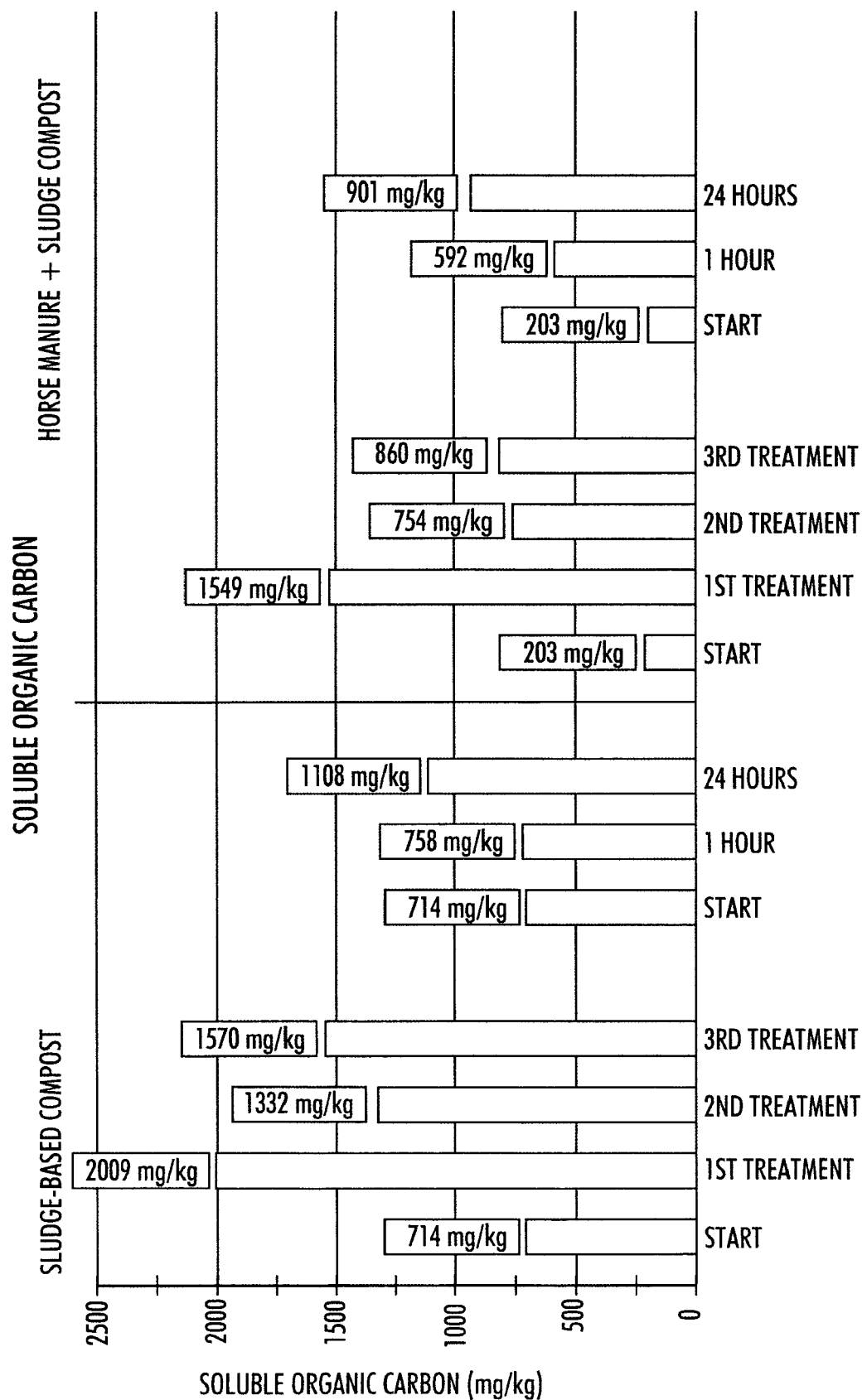
FIG. 4 shows the amount of soluble organic carbon.

FIG. 4 shows the amount of soluble organic carbon. In the left half of FIG. 4 the starting point is sludge-based compost, while on the right side of FIG. 4 the starting point is composted horse manure, i.e. a mixture of horse manure and sludge compost. The designations at the bottom of FIG. 4 indicate the following:

| | |
| --- | --- |
| Start: | Sample taken from untreated material |
| 1st treatment: | Sampling after the first steam treatment |
| 2nd treatment: | Sampling after the second steam treatment |
| 3rd treatment: | Sample taken after the third steam treatment |
| 1 hour: | Sampling of material having been treated once, performed one hour after the treatment |
| 24 hours: | Sampling of material having been treated once, performed 24 hours after the treatment |

Figure 5:
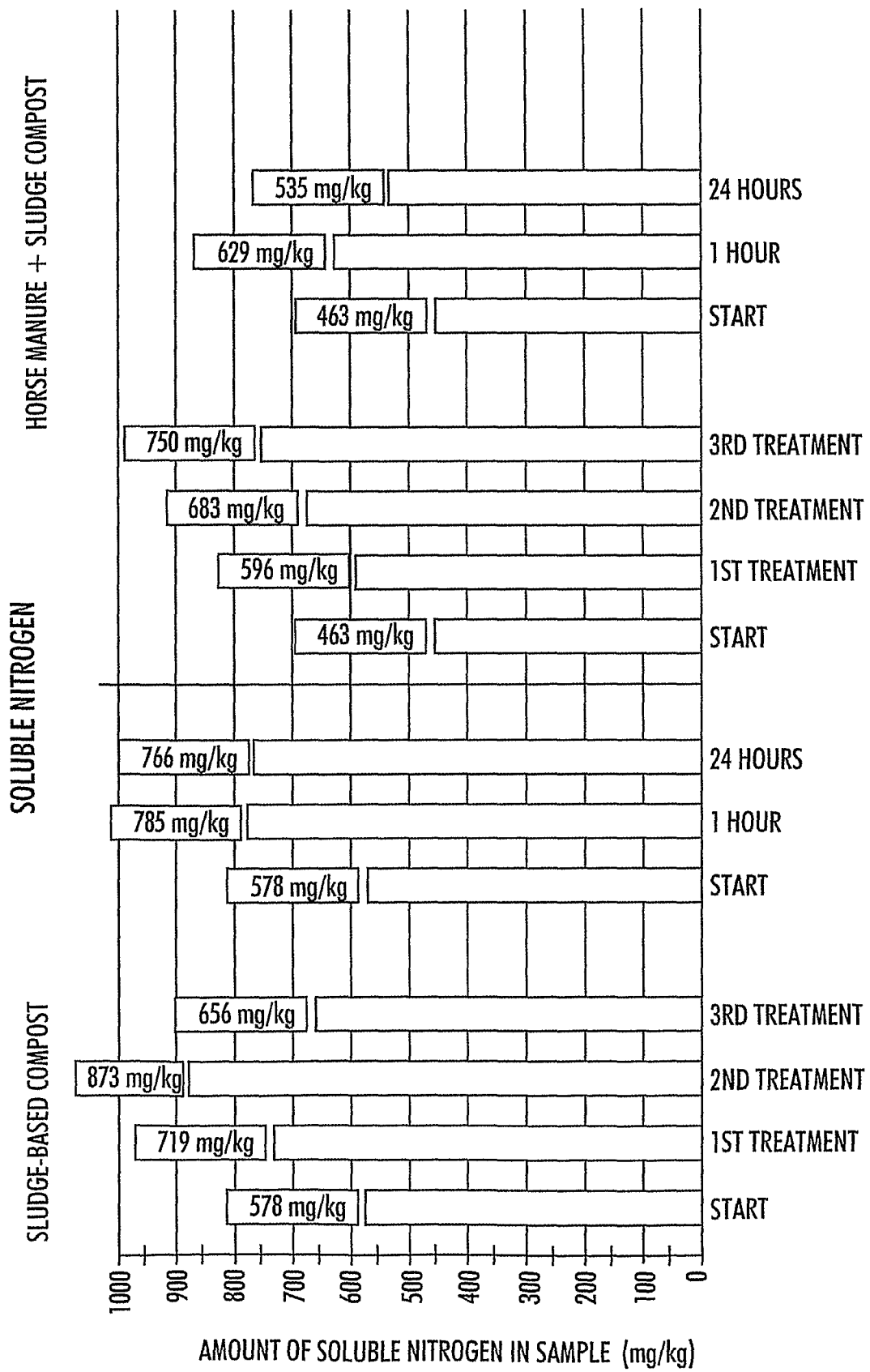
FIG. 5 shows the amount of soluble nitrogen.

In the context of FIG. 4 and FIG. 5, the sludge is heated to about 80° C. Referring to the readings of FIG. 4, carbon solubilization occurred in every treatment. In other words, the steam treatment and letting the material settle after that broke biological structures, such as sludge flocks, and possibly also cells in the materials. For example, it can be noted that in the case of sludge-based compost, the amount of soluble organic carbon had increased after the first steam treatment from the value of 714 mg/kg to the value of 2009 mg/kg, i.e. nearly threefold. Solubilization of carbon contributes to the restart of biodegradation, i.e. composting: as a result of the restart of biodegradation, cooling of the material after steam treatment was slower due to the heat generated by the biodegradation. Measured from material steam-treated only once and allowed to settle for 24 hours, the amount of soluble carbon had, in the case of sludge-based compost, increased to the value of 1 108 mg/kg from the original value of 714 mg/kg, i.e. to at least over 1.5-fold of the original.

An increase in hydrocarbon compounds was also detected, which resulted from solubilization of carbon illustrated by FIG. 4. For example, it can be noted that in the case of sludge-based compost, the number of hydrocarbon compounds had increased after the first steam treatment from the value of 30 mg/kg to the value of 98 mg/kg, i.e. to over threefold, and with the second steam treatment the value was as high as 398 mg/kg, i.e. about 13-fold compared with the initial situation. Measured from material steam-treated only once and allowed to settle for 24 hours, the amount of hydrocarbon compounds had, in the case of sludge-based compost, increased to the value of 260 mg/kg from the original value of 30 mg/kg, i.e. to nearly 9-fold of the original.

In view of the main nutrients, the following deals with soluble nitrogen. Referring to FIG. 5, solubilization of nitrogen was achieved in every treatment. This is a phenomenon parallel to an increase in soluble carbon. When biological structures break, also the intracellular, nitrogen-containing proteins are released. The titles for the bars at the bottom of FIG. 5 are as indicated above in the context of FIG. 4. For example, in the case of sludge-based compost, the amount of soluble nitrogen had increased after the first steam treatment from the value of 578 mg/kg to the value of 719 mg/kg, in other words there was an increase of nearly 25%. With the second steam treatment, the value was as high as 873 mg/kg, in other words there was an increase of more than 50%. Measured from material steam-treated only once and allowed to settle for 24 hours, the amount of soluble nitrogen had, in the case of sludge-based compost, increased to the value of 785 mg/kg from the original value of 578 mg/kg, in other words there was an increase of more than 35%.

As regards another soluble main nutrient, i.e. ammonium nitrogen, an increase in the amount was observed. For example, in the case of horse manure compost, the amount of ammonium nitrogen had increased after the first steam treatment from the value of 147 mg/kg to the value of 227 mg/kg, in other words there was an increase of at least 50%.

There was also an increase in the amount of yet another main nutrient, i.e. phosphor. The increase in phosphor is related to the fact that intracellular, phosphor-containing nucleic acids are released when biological structures break. For example, in the case of sludge-based compost, the amount of phosphor had increased after the first steam treatment from the value of 103 mg/kg to the value of 191 mg/kg, in other words there was an increase of more than 85%. With the second steam treatment, the value was as high as 250 mg/kg, in other words there was an increase of more than 142% compared with the initial situation. Measured from material steam-treated only once and allowed to settle for 24 hours, the amount of soluble phosphor had, in the case of sludge compost, increased to the value of 186 mg/kg from the original value of 103 mg/kg, in other words there was an increase of more than 80%.

The following concerns soluble trace elements. Solubilization of trace nutrients was also detected with regard of trace elements, such as copper, manganese, magnesium and calcium. For example, in the case of sludge-based compost, the amount of soluble calcium had increased after the first steam treatment from the value of 105 mg/kg to the value of 238 mg/kg, in other words there was an increase of more than 125%. Measured from material steam-treated only once and allowed to settle for 24 hours, the amount of calcium had, in the case of sludge compost, increased to the value of 364 mg/kg from the original value of 105 mg/kg, in other words to about 3.5-fold.

Referring to all aspects described above, a product is obtained which is well applicable as fertilizer.

Referring to the experimental arrangements 2 to 3, the solid matter content was determined by weighing it before drying and after drying. The conductivity, i.e. the sum content of soluble ions, was determined by extracting the samples with water, and the conductivity of the extract was measured with a conductivity meter. Correspondingly, the pH was determined by extracting the samples with water, and the pH of the extract was measured with a pH meter. Referring to FIGS. 4 to 5, the enterobacterium content was determined in accordance with the NMKL 144:00 standard. The *Escherichia coli* content (*E. Coli*) was determined in accordance with the NMKL 125:96 standard. The clostridium content was determined in accordance with the NMKL 56:95 standard.

By means of the invention, fertilizer meeting the requirements of the Fertilizer Act (2007) is provided with the right kind of sludge treatment.

Thus, the invention relates to the solubilization of what is called non-bioavailable carbon, carried out with superheated steam. During the steam treatment, the non-bioavailable carbon, such as fatty acids, change from the normal unextractible form into a soluble form, in which they are available for microorganisms again.

By means of the method, fatty acids, different sterols and other cellular components are solubilized. These components are not normally bioavailable in sludge. The extent of solubilization is even more than 5 g/kg (per kilogram of dry matter). This phenomenon is represented by the increase in extractable organic compounds (fatty acids, different sterols and other cellular components) in anaerobic sludge, for example, in Table 3.

TABLE 3

| Content of extractible organic compounds (mg/kg) | Increase (%) |
| --- | --- |
| Untreated anaerobic raw sludge: 30 | 0 |
| Treated sludge 1 min after treatment: 98 | 326 |
| Treated sludge 60 min after treatment: 515 | 1716 |

Table 4 indicates the same in horse manure treated with superheated steam.

TABLE 4

| Content of extractible organic compounds (mg/kg) | Increase (%) |
| --- | --- |
| Untreated horse manure: 262 | 0 |
| Treated horse manure 1 min after treatment: 397 | 151 |
| Treated horse manure 60 min after treatment: 721 | 275 |

The very same phenomenon can be seen from Tables 5 and 6 for DOC (dissolved organic carbon).

TABLE 5

| DOC (mg/kg) | Increase (%) |
| --- | --- |
| Untreated anaerobic raw sludge: 45 | 0 |
| Treated sludge 1 min after treatment: 124 | 275 |

TABLE 6

| DOC (mg/kg) | Increase (%) |
| --- | --- |
| Untreated horse manure: 12 | 0 |
| Treated horse manure 1 min after treatment: 94 | 783 |

Thus, the invention relates to a method for producing fertilizer out of sludge that has already been biodegraded once. The method comprises heating the biodegraded sludge with superheated steam and then increasing the amount of soluble carbon, after which bioredegradation is started.

Although the invention has been described above with reference to the example of the attached drawings, it is obvious that the invention is not restricted thereto but may varied in a plurality of ways within the scope of the claims.

The invention claimed is:

1. A method of producing fertilizer out of sludge, in which method sludge is heated with superheated steam for achieving hygienization to destroy pathogenic microorganisms, wherein
   the sludge is heated to a temperature of 60 to 100° C. with superheated steam, which is a gas mixture out of water vapour and combustion gas of a fuel, the superheated steam having a temperature of 200 to 600° C. to activate increasing of the amount of soluble carbon in the sludge and to restart biodegradation of the sludge by using non-pathogenic microorganisms still remaining in the sludge after the heating.

2. A method according to claim 1, wherein the sludge is heated to a temperature of 60 to 90° C.

3. A method according to claim 1, wherein the sludge is treated with said superheated steam for 20 to 60 minutes.

4. A method according to claim 3, wherein the sludge is treated with said superheated steam for 20 to 30 minutes.

5. A method according to claim 1, wherein monitoring and controlling the moisture of the sludge is effected during the treatment with said superheated steam to prevent substantial drying of the sludge.

6. A method according to claim 5, wherein monitoring and controlling the moisture of the sludge during the treatment with said superheated steam is effected in such a way that the moisture of the material changes in the treatment by +/−2% at most to prevent substantial drying of the sludge.

7. A method according to claim 5, wherein controlling the moisture of the sludge during the treatment with said superheated steam is effected in such a way that the amount of water to be mixed into combustion gas is changed in generating said superheated steam.

8. A method according to claim 1, wherein minimizing the evaporation of nitrogen-containing ammonia or another nitrogen compound generated by the sludge is effected by maintaining a moisture level and/or a temperature during the treatment with superheated steam.

9. A method according to claim 1, wherein said superheated steam has a temperature of 300 to 600° C.

10. A method according to claim 9, wherein said superheated steam has a temperature of 300 to 400° C.

11. A method according to claim 1, wherein the sludge to be treated is a member selected from the group consisting of: municipal sludge, agricultural sludge and sewage sludge.

12. A method according to claim 1, wherein the sludge treatment with said superheated steam is performed with a steam-treatment apparatus which comprises at least one steam-treatment unit arranged to use superheated steam and into which the material to be treated is brought.

13. A method according to claim 1, comprising performing the method with a steam-treatment apparatus comprising a first and a second steam-treatment unit arranged to use superheated steam, and by transferring the material treated in the first steam-treatment unit into the second steam-treatment unit.

14. A method according to claim 1, wherein the treatment with said superheated steam is performed in normal atmospheric pressure in an unpressurized steam treatment unit.

15. A method according to claim 1, wherein the treatment with said superheated steam is performed as a continuous-type process instead of a closed batch-type process.

16. A method according to claim 12, comprising bringing sludge to the treatment with said superheated steam in a continuous process, and removing sludge from the treatment with said superheated steam.

17. A method according to claim 1, comprising monitoring, after the treatment with said superheated steam during biore-degradation of the sludge, the maturity degree of the biodegradation of the sludge.

18. A method according to claim 17, comprising monitoring the maturity degree of the bioredegradation of the sludge by measuring gas emissions of the sludge.

19. A method according to claim 17, comprising monitoring the maturity degree of the bioredegradation of the sludge by measuring carbon dioxide emissions of the sludge.

20. A method according to claim 12, wherein the bioredegradation of the sludge takes place mainly elsewhere than in the steam-treatment apparatus having performed the sludge heating with said superheated steam.

21. A method according to claim 20, wherein the bioredegradation of the sludge takes place in a clamp or another heap or formation to which the sludge has been taken from the steam-treatment unit having performed the treatment with said superheated steam.

22. A method according to claim 1, wherein the duration of the bioredegradation is 1 to 3 months.

* * * * *